(12) United States Patent
Suraparaju

(10) Patent No.: US 12,225,004 B2
(45) Date of Patent: Feb. 11, 2025

(54) OPENID OFFLOADING PROXY

(71) Applicant: Konica Minolta Business Solutions U.S.A., Inc., Ramsey, NJ (US)

(72) Inventor: Rahul Suraparaju, Fremont, CA (US)

(73) Assignee: Konica Minolta Business Solutions U.S.A., Inc., Ramsey, NJ (US)

(*) Notice: Subject to any disclaimer, the term of this patent is extended or adjusted under 35 U.S.C. 154(b) by 229 days.

(21) Appl. No.: 18/148,786

(22) Filed: Dec. 30, 2022

(65) Prior Publication Data

US 2024/0223551 A1 Jul. 4, 2024

(51) Int. Cl.
*G06F 21/00* (2013.01)
*H04L 9/40* (2022.01)

(52) U.S. Cl.
CPC .................. *H04L 63/083* (2013.01)

(58) Field of Classification Search
CPC ............ H04L 63/083; H04L 63/0807; H04L 63/0815
See application file for complete search history.

(56) References Cited

U.S. PATENT DOCUMENTS

| | | | | |
|---|---|---|---|---|
| 2015/0332029 | A1* | 11/2015 | Coxe | G06F 21/31 726/5 |
| 2018/0063140 | A1* | 3/2018 | D | H04L 63/10 |
| 2020/0213297 | A1* | 7/2020 | Suraparaju | H04L 63/0892 |
| 2023/0195516 | A1* | 6/2023 | Saraf | G06F 9/4881 718/102 |

\* cited by examiner

*Primary Examiner* — William A Corum, Jr.
(74) *Attorney, Agent, or Firm* — Buchanan Ingersoll & Rooney PC

(57) ABSTRACT

A method, a non-transitory computer readable medium, and a computer system for accessing protected resources. The method includes receiving, by a processor, a request from an OpenID-unaware application for access to a protected resource; authenticating, by the processor, the OpenID-unaware application; establishing, by the processor, an OpenID connection with an OpenID relying party upon authentication of the OpenID-unaware application; and receiving, by the processor, an access token issued by an OpenID identity provider for the OpenID-unaware application for access to the protected resource.

18 Claims, 5 Drawing Sheets

OPENID OFFLOADING PROXY

FIELD OF THE DISCLOSURE

The present disclosure generally relates to an OpenID offloading proxy, and more particularly, to a method and system for accessing protected resources from an OpenID-unaware application by establishing an OpenID connection with an OpenID relying party with an OpenID offloading proxy in communication with the OpenID-unaware application.

BACKGROUND

OpenID is a technology standard that provides a framework for the communication that takes place in various different ways involving a software application, a user, an identity provider, and the OpenID acceptor (or relying party). OpenID framework standardizes various different tokens meant for application programming interface (API) access control. The API based security portion of OpenID is inherited from OAuth2.0.

API security is critical component to an application; however, it also brings additional design and implementation complexity to each application. Accordingly, traditional, and classical ways of OpenID integration may not be considered to be ideal for applications that are being developed today. For example, despite the protocol and OpenID flow requirements involved, each application needs to be OpenID-aware, i.e., each application needs to have software code (or code) that performs the network operations required to satisfy the OpenID protocol.

Complex software systems comprise a wide variety of distributed applications which securely exchange data using OpenID based API-security mechanisms. The application programming interface access authorization token is obtained by a requesting application, and the service/application granting the access can be another application within the same system or can be third party application by a different vendor. The traditional OpenID way of having secure API access requires each application to be OpenID aware. Since each application needs to have the piece of software code (or code) that performs the network operations required to satisfy the OpenID protocol, this requirement can add development costs and also delay the release of an application to market.

SUMMARY

In consideration of the above issues, it would be desirable to have a solution that delivers a unique centralized OpenID off-loader, which can be an OpenID offloading proxy that offloads the OpenID semantics from applications, and in particular, abstracts away specific design and implementation burden (that are otherwise required), and wherein the applications are not required to be OpenID-aware (i.e., the applications are OpenID-unaware). In addition, it would be desirable that the solution provides an HTTP handshake with the OpenID offloading proxy that can be implemented to facilitate the authentication over API calls.

In accordance with one aspect, a method is disclosed for accessing protected resources, the method comprising: receiving, by a processor, a request from an OpenID-unaware application for access to a protected resource; authenticating, by the processor, the OpenID-unaware application; establishing, by the processor, an OpenID connection with an OpenID relying party upon authentication of the OpenID-unaware application; and receiving, by the processor, an access token issued by an OpenID identity provider for the OpenID-unaware application for access to the protected resource.

In accordance with another aspect, a computer program product for accessing protected resources, the computer program product comprising: a non-transitory computer-readable storage medium having program instructions embodied therewith, the program instructions executable by a computer to cause the computer to perform a process, comprising: receiving a request from an OpenID-unaware application for access to a protected resource; authenticating the OpenID-unaware application; establishing an OpenID connection with an OpenID relying party upon authentication of the OpenID-unaware application; and receiving an access token issued by an OpenID identity provider for the OpenID-unaware application for access to the protected resource.

In accordance with a further aspect, a computer system comprising: a memory; and a processor configured to: receive a request from an OpenID-unaware application for access to a protected resource; authenticate the OpenID-unaware application; establish an OpenID connection with an OpenID relying party upon authentication of the OpenID-unaware application; and receive an access token issued by an OpenID identity provider for the OpenID-unaware application for access to the protected resource.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
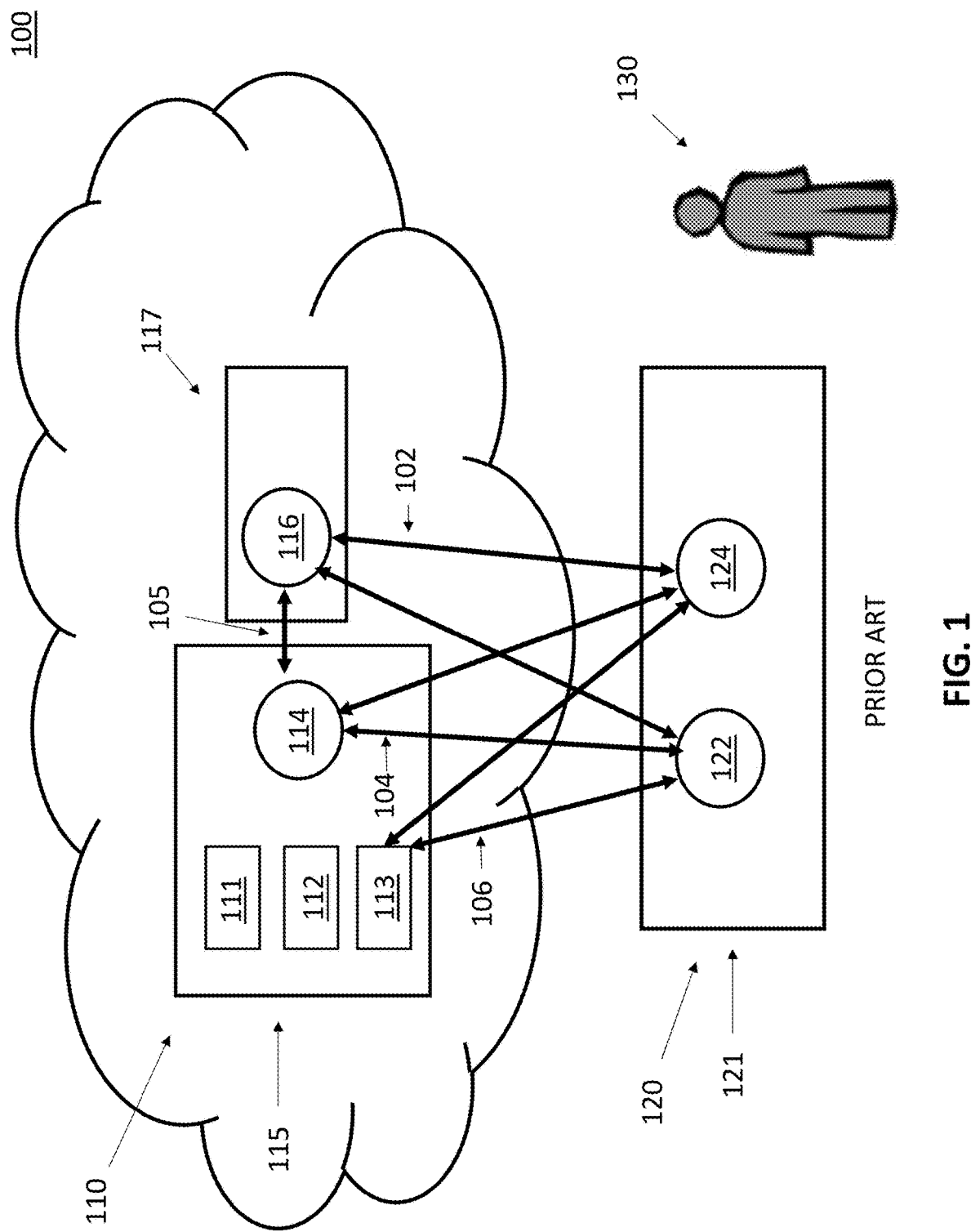
FIG. 1 is an illustration of a current OpenID based ecosystem.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is an illustration of a current OpenID based ecosystem 100. As shown in FIG. 1, the current OpenID based ecosystem 100 can include one or more protected resources 110 and an on-premises system 120. The one or more protected resources 110 can be configured to be accessed via one or more resource application programing interfaces (API) 111, 112, 113, an OpenID relying party (RP) 114, an OpenID provider (or OpenID identify provider) 116, and one or more OpenID-aware client applications 122, 124. The one or more resource application programming interfaces (API) 111, 112, 113 (or end users) can be, for example, software development kit (SDK)/application programming interface (API) that interacts with the OpenID relying party (RP) 114. The one or more protected resources 110 can also be hosted on one or more cloud servers 115 with the OpenID relying party 114. Alternatively, the one or more protected resources 110, the OpenID relying party 114 and the OpenID provider 116 can be hosted on one or more cloud servers 115, 117.

The one or more resource application programming interfaces (API) 111, 112, 113 is an entity for whom the identity information is being requested. For example, in OAuth 2.0 this can be referred to as the resource owner. The OpenID relying party 114 is a client application that supports OAuth 2.0 and relies on the OpenID provider 116 to authenticate a user (or end-user) 130 and request information or claims about that user 130. The OpenID provider 116, for example, can be an OAuth 2.0 authorization server which offers user authentication, user consent, and token issuance as a service. The OpenID provider 116 helps ensure that the user 130 is authenticated and provides information or claims about the user 130 and the authentication event to the OpenID relying party 114.

The OpenID provider 116 can provide the OpenID relying party 114 information about the user 130 through an ODIC token or identity token. Different types of tokens can be exchanged between the one or more resource application programing interfaces (API) 111, 112, 113, the OpenID relying party (RP) 114, the OpenID provider (or OpenID identify provider) 116, and the one or more OpenID-aware client applications 122, 124 to verify the identity or provide access permissions. Tokens establish a user's identity during a transaction between the one or more resource application programing interfaces (API) 111, 112, 113, the OpenID relying party (RP) 114, the OpenID provider (or OpenID identify provider) 116, and the one or more OpenID-aware client applications 122, 124.

Token types can include one or more of an identifier (ID) token and an access token. The ID token can be similar to an ID card or passport, and it contains many required attributes or claims about the user 130. The ID token can be a JSON (JavaScript Object Notation) web token (JWT) digitally signed using a JSON web signature for a relatively high-level of security. The access token gives permission to the OpenID relying party 114 to obtain end-user owned resources from a resource server associated with the one or more resource application programing interfaces (API) 111, 112, 113. The access token can be an opaque token that is validated by fetching information or claims of the user 130 from an endpoint, for example, a "UserInfo endpoint". The UserInfo endpoint being an OAuth 2.0 protected resource of the Connect2id server where client application can retrieve consented claims, or assertions about a logged in end-user. The claims can be packaged in a JSON object where a sub member denotes a subject or user (end-user) identifier.

As shown in FIG. 1, the user 130 via the one or more OpenID-aware client applications 122, 124 may request protected resources 110 via one or more resource application programming interfaces (API) 111, 112, 113 via the OpenID relying party (RP) 114 (104). The OpenID relying party 114 may communicate with the OpenID provider 116 via one or more modes (105) that can include a checkid_immediate mode (104) and a checkid_setup mode (102). In the checkid_immediate mode (104), the OpenID relying party (RP) 114 requests that the OpenID provider 116 not interact with the one or more OpenID-aware client applications 122, 124 such that all communications are relayed through a user-agent for the one or more OpenID-aware client applications 122, 124 without explicitly notifying the one or more OpenID-aware client applications 122, 124. In the checkid_setup (102), the one or more OpenID-aware client applications 122, 124 communicate with the OpenID provider 116 via the same user-agent used by the one or more OpenID-aware client applications 122, 124 to access the OpenID relying party (RP) 114. The OpenID relying party (RP) 114 and the OpenID provider 116 can optionally establish a shared secret, referenced by an associate handle, which the OpenID relying party (RP) 114 then stores. If using the checkid_setup mode, the OpenID relying party (RP) 114 redirects the user-agent of the one or more OpenID-aware client applications 122, 124 to the OpenID provider 116 so that the one or more OpenID-aware client applications 122, 124 can authenticate directly with the OpenID provider 116. The method of authentication may vary, but typically, the OpenID provider 116 prompts the one or more OpenID-aware client applications 122, 124 for a password or some cryptographic token, and the OpenID provider 116 asks whether the one or more OpenID-aware client applications 122, 124 trusts the OpenID relying party (RP) 116 to receive the necessary identity details.

If the one or more OpenID-aware client applications 122, 124 declines the OpenID provider's request to trust the OpenID relying party (RP) 114, then the user-agent of the one or more OpenID-aware client applications 122, 124 is redirected back to the OpenID relying party 114 with a message indicating that authentication was rejected and the relying party in turn refuses to authenticate the one or more OpenID-aware client applications 122, 124.

If the one or more OpenID-aware client applications 122, 124 accepts the request of the OpenID provider 116 to trust the OpenID relying party (RP) 114, then the user-agent of the one or more OpenID-aware client applications 122, 124 is redirected back to the OpenID relying party (RP) 114 along with the end user's credentials. The OpenID relying party 114 must then confirm that the credentials really came from the OpenID provider 116. If the OpenID relying party (RP) 114 and the OpenID provider 116 had previously established a shared secret, then the OpenID relying party (RP) 114 can validate the identity of the OpenID provider 116 by comparing its copy of the shared secret against the one received along with the credentials of the one or more OpenID-aware client applications 122, 124. The OpenID relying party (RP) 114 is called stateful because it stores the shared secret between sessions. In contrast, a stateless or dumb relying party must make one more background request (check_authentication) to ensure that the data indeed came from the OpenID provider 116.

After the OpenID has been verified, authentication is considered successful and the OpenID-aware client applications 122, 124 is considered to be logged into the OpenID relying party (RP) 114 under the identity specified by the given OpenID. The OpenID relying party (RP) 114 typically then stores the OpenID of the OpenID-aware client applications 122, 124 along with other session information of OpenID-aware client applications 122, 124.

As shown in FIG. 1, the OpenID provider 116 authenticates the user 130 via the one or more OpenID-aware client applications 122, 124, and a claim, or set of claims that identifies the information that is requested for authentication for the user 130 can be filled and an OIDC token can be issued for the user 130 to the one or more OpenID-aware client applications 122, 124.

Once the OIDC token has been issued by the OpenID provider 116, the one or more OpenID-aware client applications 122, 124 submits the OIDC token to the OpenID relying party (RP) 114. The OpenID relying party (RP) 114 validates the OpenID token and authorizes the user 130 via the one or more OpenID-aware client applications 122, 124 to access to one or more protected resources via the one or more resource application programing interfaces (API) 111, 112, 113.

The one or more OpenID-aware client applications 122, 124 can then securely access (106) the one or more protected resources 110 via the one or more resource application programming interfaces (API) 111, 112, 113, for example, via a software development kit (SDK)/application programming interface (API).

Figure 2:
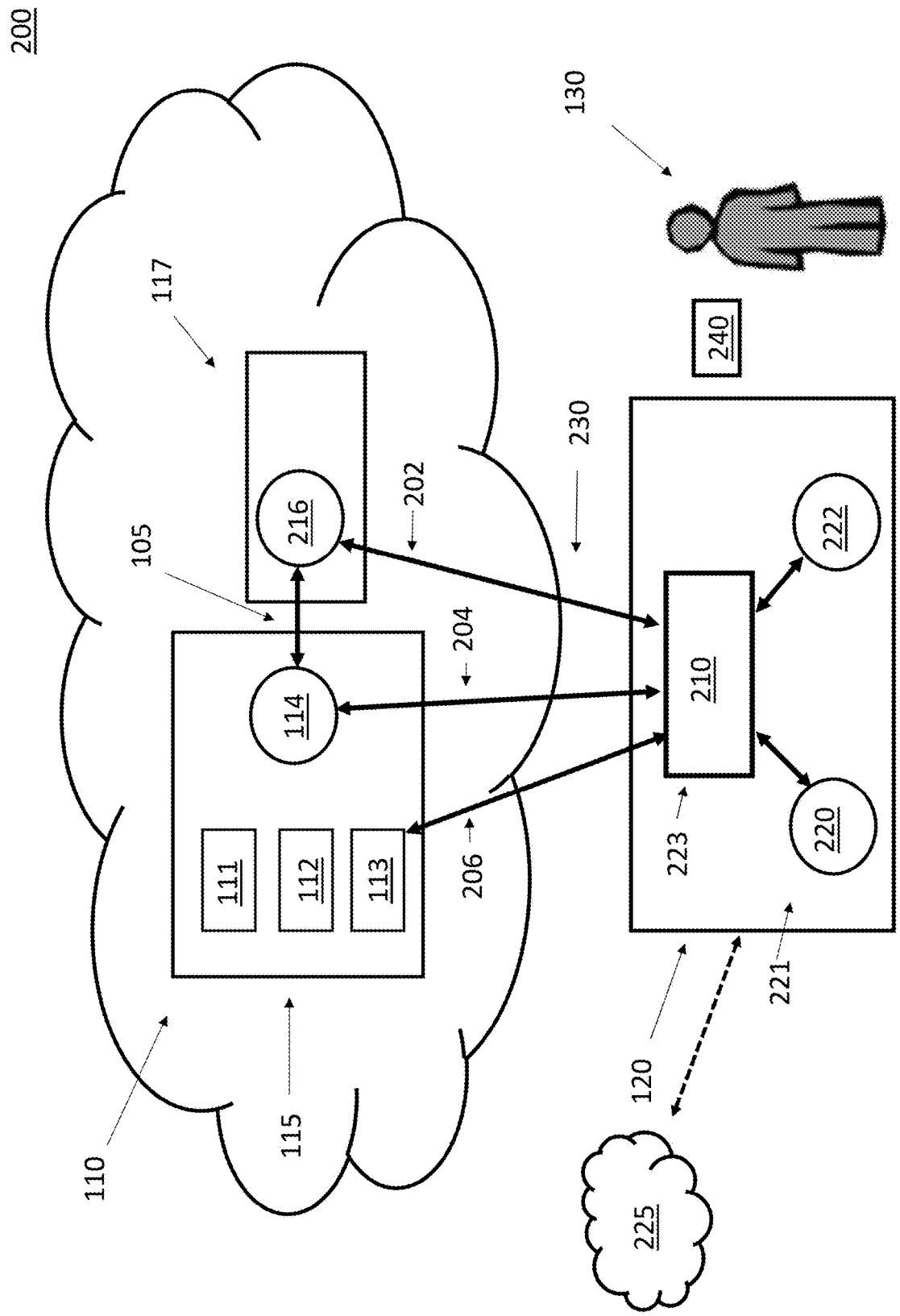
FIG. 2 is an illustration of an OpenID ecosystem with an OpenID offloading proxy in accordance with an exemplary embodiment.

FIG. 2 is an illustration of an OpenID ecosystem 200 with an OpenID offloading proxy 210 in accordance with an exemplary embodiment. As shown in FIG. 2, the OpenID based ecosystem 200 can include one or more protected resources 110 that are accessible via the one or more resource application programing interfaces (API) 111, 112, 113. The OpenID based ecosystem 200 can also include the OpenID relying party (RP) 114, an OpenID provider (or OpenID identify provider), for example, an OpenID provider with role based access control (RBAC) 216, the OpenID offloading proxy 210, and one or more OpenID-unaware client applications 220, 222. The one or more resource application programming interfaces (API) 111, 112, 113 can include, for example, a software development kit (SDK)/application programming interface (API) that interacts with the OpenID relying party (RP) 114. The one or more protected resources 110 that are accessible via the one or more resource application programming interfaces (API) 111, 112, 113, and the one or more resource application programming interfaces (API) 111, 112, 113, can also be hosted on one or more cloud servers 115, 117 with the OpenID relying party 114 and the OpenID provider with role based access control (RBAC) 226. In accordance with an embodiment, the OpenID provider with RBAC 216 can be configured, for example, to restrict access to authorized users 130, which can be implement, for example, via mandatory access control (MAC) or discretionary access control (DAC) protocols.

The OpenID offloading proxy 210 and the one or more OpenID-unaware client applications 220, 222 can be on-premises, i.e., using on-premises software that is installed and runs on one or more computers 221, 223 on the premises of the user 130 or organization using the software. Alternatively, the one or more OpenID-unaware client applications 220, 222, can be software being installed and run at an edge computing system or a cloud computer system remote facility such as a server farm or cloud 225.

In accordance with an embodiment, the one or more OpenID-unaware client applications 220, 222, can involve an initial handshake and going through an Application OpenID life cycle (Finite State Machine) with the OpenID offloading proxy 210. The OpenID offloading proxy 210 and the one or more OpenID-unaware client applications 220, 222 can communicate, for example, with one another via a PKI-based application authentication method. For example, the PKI-based application authentication method can use certificates to validate data being sent from one point to another. Each of the OpenID offloading proxy 210 and the one or more OpenID-unaware client applications 220, 222 has a public key and a private key. Under the PKI certificate-based authentication, the public key is shared and used to validate the identity of the user 130 and the corresponding one or more OpenID-unaware client applications 220, 222 by transmitting the data and decrypting of the data.

In accordance with an embodiment, the one or more OpenID-unaware client applications 220, 222 can interact with the OpenID Offloading proxy 210, for example, by connecting using standard secure hypertext transfer protocol (HTTPS) means. The OpenID Offloading proxy 210 terminates the incoming HTTPS connection from each of the one or more OpenID-unaware client applications 220, 222, and maps (mediation and adaptation) the details onto a new connection with the OpenID relying party (RP) 114 to access the protected resources 110 via the one or more resource application programming interfaces (API) 111, 112, 113.

As shown in FIG. 2, the OpenID offloading proxy 210 on behalf of the one or more OpenID-unaware client applications 220, 222 may request (204) protected resources 110 via the one or more resource application programing interfaces (API) 111, 112, 113. In accordance with an embodiment, at an authentication phase of each one or more OpenID-unaware client applications 220, 222, the OpenID Offloading Proxy 210 establishes the OpenID connection with the OpenID Relying Party (RP) 114 and initiates the flow towards OpenID provider with RBAC 216. The OpenID provider 216 authenticates (202) the user 130 via the one or more OpenID-unaware client applications 220, 222, and a claim, or set of claims that identifies the information that is requested for authentication for the user 130 can be filled and an OIDC token can be issued to the OpenID offloading proxy 210 for the user 130 and the one or more OpenID-unaware client applications 220, 222.

Once the OIDC token has been issued by the OpenID provider with RBAC 216, the OpenID offloading proxy 220 can establish an OpenID connection with the OpenID relying party (RP) 114 by submitting (204) the OIDC token to the OpenID relying party (RP) 114. The OpenID relying party (RP) 114 validates the OpenID token and authorizes the user 130 via the one or more OpenID-unaware client applications 220, 222 to access (206) to the one or more protected resources 110 via the one or more resource application programing interfaces (API) 111, 112, 113.

In accordance with an embodiment, the one or more OpenID-unaware applications 220, 222 can be hosted on a computer system or client device 221. The computer system or client device 221, for example, can be a multifunction peripheral or multifunction printer (MFP), a computer system, a personal computer, a mobile device, a smart phone, a smart tablet, or smart watch. In addition, an authenticator 240, for example, a biometric band that can be used for authentication of the user 130 on the one or more OpenID-unaware applications 220, 222. The computer system or client device 221 can alternatively, for example, be a medical device or a medical apparatus, which can be used, for example, for diagnostic and/or therapeutic purposes. Examples of medical devices or medical apparatuses can include medical imaging devices, which can obtain, for example, radiological, angiographic, sonographic, and/or tomographic images.

In accordance with an embodiment, the one or more OpenID-unaware applications 220, 222, can be for accessing a protected resource 110, which can be a secure software application. For example, the one or more OpenID-unaware applications 220, 222, can be applications that access a secure software application that manages print services associated with a multifunction peripheral or multifunctional printer (MFP). The print services can include, for example, one or more of user authentication, monitoring and reporting, user and cost management, cost accounting and budget management, printer queue management, and workflow management. For example, user authentication can include control over identities of user 130, which can help ensure that a user 130 has been authenticated at a device before a print job is released and/or printed. The monitoring and report features can allow administrators to track and monitor usage in real time through regular, scheduled and on-demand reporting. The user and cost management feature can help manage and charge back costs by assigning users to cost centers, or enabling them to select the relevant cost center, billing or project code before printing a document. In addition, the user and cost management feature can be used to create print rules or policies, which can help ensure tighter cost management by allowing different user roles to access different devices and features. For example, the user and cost management feature can control, for example, duplex printing and/or color printing to individuals and/or groups. In addition, cost accounting and budget management provides for cost control and flexibility, which can be used as a print management solution that allows administrators to assign print budgets to users, with the option to top up their accounts. For example, in an environment such as a university, for example, this allows administrators to give students a free print quota that they can add to as required. In addition, a print queue management can be used for managing of individual production in addition to office print queues in an office, for example.

In accordance with an embodiment, the OpenID based ecosystem 200 can include the one or more protected resources 110, the one or more resource application programing interfaces (API) 111, 112, 113, the OpenID relying party (RP) 114, the OpenID provider (or OpenID identify provider) with role based access control (RBAC) 216, the OpenID offloading proxy 210, and the one or more OpenID-unaware client applications 220, 222, which can be connected via one or more communication networks 230. The communication networks 230 may include, for example, a conventional type of network, wired or wireless, and may have any number of configurations, such as a star configuration, token ring configuration, or other known configurations. The communication networks 230 may include one or more local area networks ("LANs"), wide area networks ("WANs") (e.g., the Internet), virtual private networks ("VPNs"), peer-to-peer networks, near-field networks (e.g., Bluetooth®), cellular networks (for example, 3G, 4G, 5G, other generations), and/or any other interconnected data path across which multiple computing nodes may communicate.

In accordance with an embodiment, the user 130 can present an authenticator 240 for authentication on the one or more OpenID-unaware applications 220, 222. The authenticator 240 can be, for example, a biometric identifier, which is a distinctive, measurable characteristics used to label and describe or identify an individual, including a metric related to human characteristics. For example, the biometric identifier can include physiological characteristics of an individual including but not limited fingerprints, palm veins, face recognition, DNA (or deoxyribonucleic acid), palm print, hand geometry, iris recognition, retina, and/or odor/scent.

Figure 3:
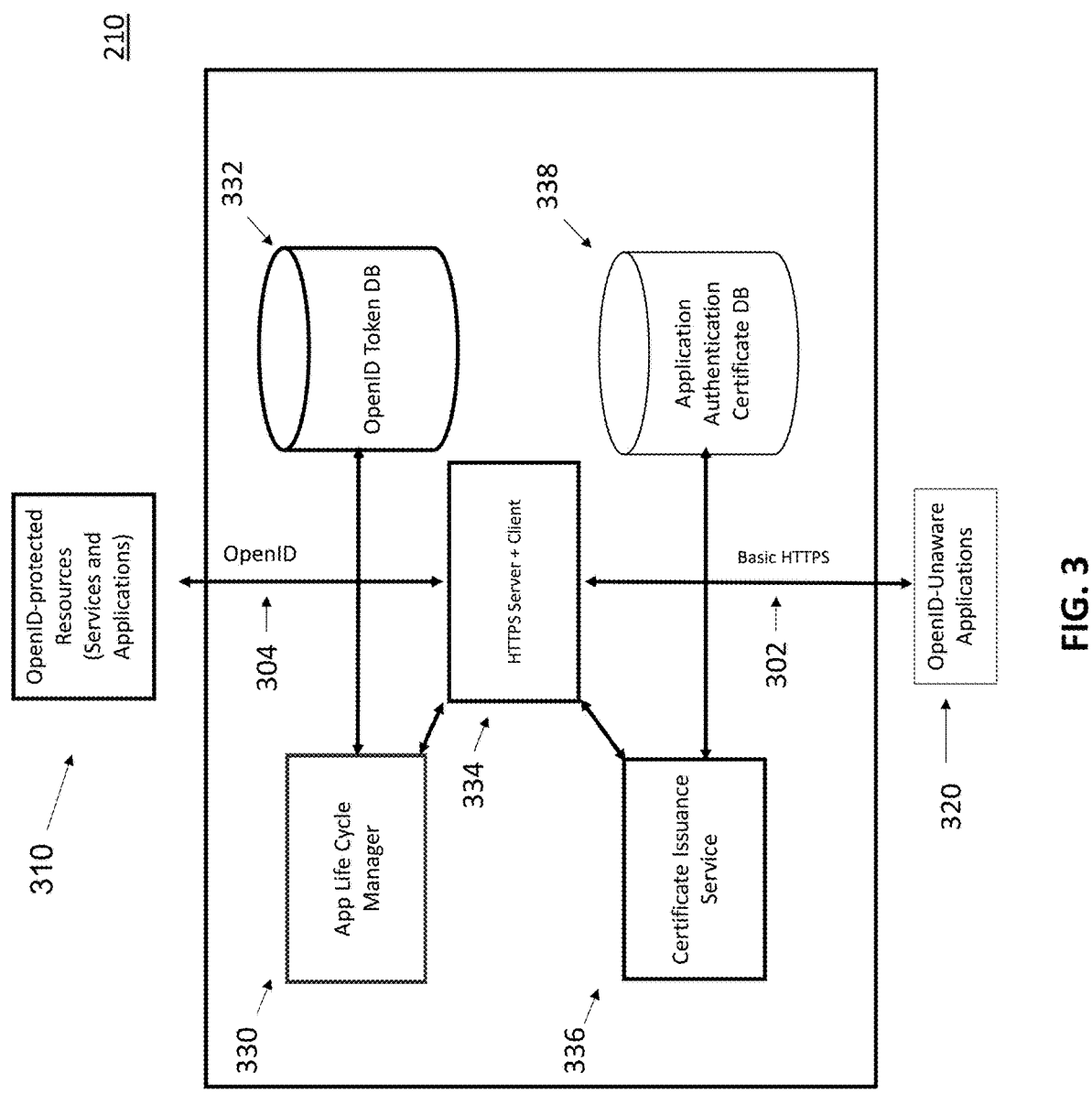
FIG. 3 is an illustration of an offloading proxy in accordance with an exemplary embodiment.

FIG. 3 is an illustration of an OpenID offloading proxy 210 in accordance with an exemplary embodiment. As shown in FIG. 3, the OpenID offloading proxy 210 is in communication with OpenID-protected resources 310, which can include services and application accessible via the one or more resource application programming interfaces (API) 111, 112, 113, and OpenID-unaware applications 320. The OpenID-unaware applications 320 can include the one or more OpenID-unaware client applications 220, 222 as shown in FIG. 2. In accordance with an embodiment, the OpenID-unaware applications 320 do not include code that performs the networks operations required to satisfy the OpenID protocol. The OpenID offloading proxy 210 can include an application life cycle manager 330, an OpenID token database (DB) 332, an HTTPS server and client 334, a certificate issuance service 336, and an application authentication certificate database (DB) 338.

In accordance with an embodiment, the application life cycle manager 330 can communicate with the HTTPS server and client 334 to assist with installation of applications, for example, on edge computing systems, provision and/or designate resources of the edge computing system, and manage lifecycles (e.g., start, stop, reset) of virtual machines.

The OpenID token database 332 is preferably a database for storing and managing tokens received from the OpenID provider with RBAC 116 as disclosed herein. The HTTPS server and client 334 is in communication with the OpenID-unaware applications 320, for example, via an HTTPS connection, and also in communication with the OpenID-protected resources 310 via an OpenID connection. The certificate issuance service 336 is configured to manage the issuance of certificate in accordance with the OpenID protocol for the one or more resource application programming interfaces (API) 111, 112, 113 and the OpenID-unaware applications 320, which can include the one or more OpenID-unaware client applications 220, 222 as disclosed herein. In addition, the OpenID offloading proxy 210 can include an application authentication certificate database 338 configured to authenticate, for example, certificates issued by the OpenID provider with RBAC 216.

In accordance with an embodiment, the OpenID offloading proxy 210 can be configured to supports one or more flow variants supported by OpenID and hence the OpenID offloading proxy 210 can be fully compliant with OpenID standard. For example, the OpenID offloading proxy can be configured to support an authorization code flow, an implicit flow, or a hybrid flow.

In addition, the OpenID offloading proxy can be configured to support one or more modes of operation including a fully proxy mode and an OpenID-only proxy mode. For example, in the full proxy mode, every packet from each application goes through the OpenID offloading proxy 210, not just the OpenID communication. Accordingly, after the OpenID connection is established, the one or more application programming interfaces (API) 111, 112, 113, and the corresponding protected resources 110 including services and/or applications that are accessible also undergoes the proxy processing. For example, the OpenID offloading proxy 210 can completely mediate all communications from the protected resources 110 including the services and/or applications via the one or more resource application programming interfaces (API) 111, 112, 113 to the one or more OpenID-unaware client applications 220, 222. In full proxy mode, the one or more OpenID-aware client applications 122, 124, for example, do not need to store OpenID tokens issued by the OpenID provider 216. Accordingly, the one or more OpenID-unaware client applications 220, 222 can access the protected resources 110 via the one or more resource application programming interfaces (API) 111, 112, 113 in a relatively transparent manner and the OpenID offloading proxy 210 can manage the burden imposed by the mediation of the communications.

Alternatively, in an embodiment, the OpenID offloading proxy 210 can include an OpenID-Only proxy mode in which the OpenID offloading proxy 210 only mediates while acquiring an OpenID access token for the requesting OpenID-unaware applications 220, 222. Once the token is acquired by the OpenID offloading proxy 210, the OpenID offloading proxy 210 supplies the access token to requesting OpenID-unaware application 220, 222, and the requesting OpenID-unaware application 220, 222 stores the access token so that the requesting OpenID-unaware application 220, 220 can place the access token in the HTTP headers during the communications with the one or more resource application programming interfaces (API) 111, 112, 113. In the OpenID-only proxy mode, the OpenID token DB 332 is not used as the OpenID offloading proxy 210 does not maintain the storage of the access tokens. In addition, another trigger for the processing by the OpenID offloading proxy 210 can be when the OpenID-unaware application 220, 222 requests to refresh, for example, an expired access token.

In accordance with an embodiment, the OpenID offloading proxy 210 follows the OpenID standards in the terms of the format of the access tokens including, for example, JSON (JavaScript Object Notation) Web Token (JWT), signed JWT, and encrypted JWT.

In accordance with an embodiment, the OpenID offloading proxy 210 can also support application priority for profiling purposes. For example, the application priority may be required if the OpenID offloading proxy 210 supports a plurality of OpenID-unaware applications 220, 222 developed by a plurality of vendors in the ecosystem 200. For example, the Application Life Cycle Manager 330 can maintain the state of each of the plurality of OpenID-unaware applications 220, 222 via a Finite State Machine, and in cases where two (2) or more OpenID-unaware applications 220, 222, have the same name, profiling will help the OpenID offloading proxy 210 decide which of the two of more OpenID-unaware applications 220, 222, and corresponding resource application programming interfaces (API) 111, 112, 113 to bring up and accept.

Figure 4:
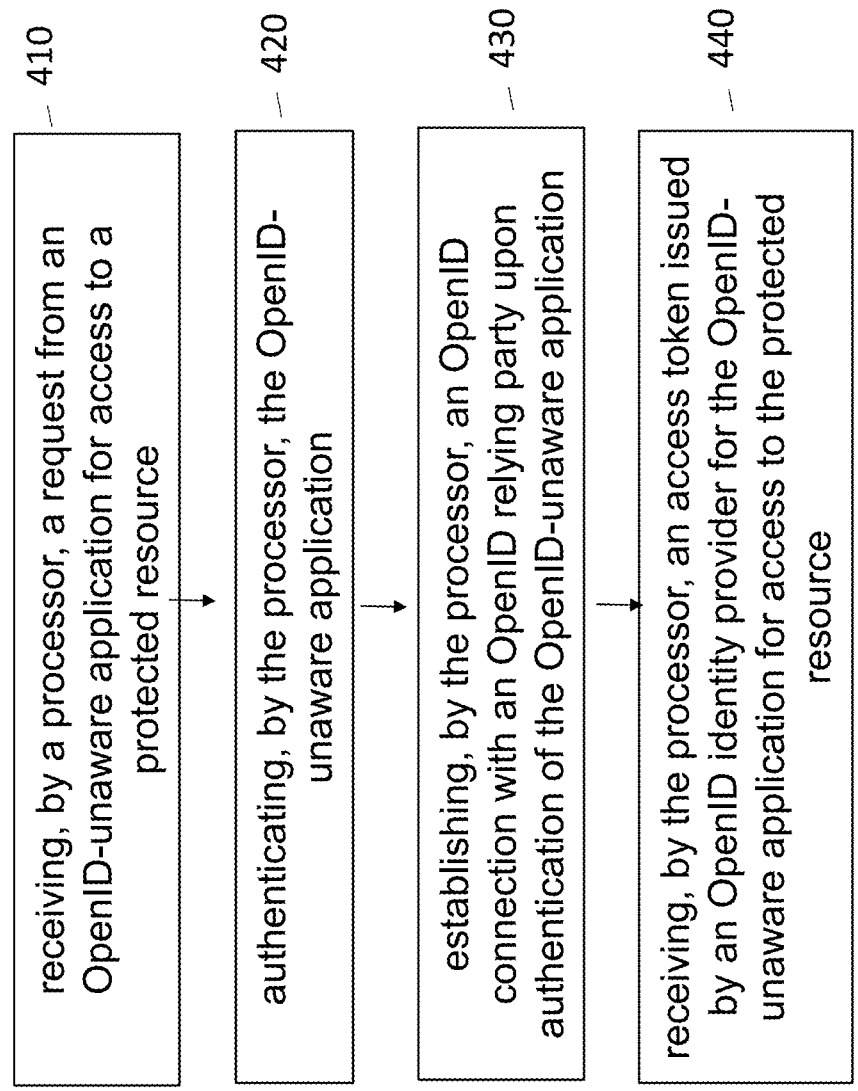
FIG. 4 is a flowchart for a method 400 for accessing protected resources in accordance with an embodiment.

FIG. 4 is a flowchart for a method 400 for accessing protected resources in accordance with an embodiment. The method includes receiving, by a processor, a request from an OpenID-unaware application for access to a protected resource (410), authenticating, by the processor, the OpenID-unaware application (420), establishing, by the processor, an OpenID connection with an OpenID relying party upon authentication of the OpenID-unaware application (430), and receiving, by the processor, an access token issued by an OpenID identity provider for the OpenID-unaware application for access to the protected resource.

In accordance with an embodiment, the method includes authenticating, by the processor, a user associated with the OpenID-unaware application, and establishing, by the processor, the OpenID connection with the OpenID relying party upon the authentication of the user associated with the OpenID-unaware application. The method further includes facilitating, by the processor, a user associated with the OpenID-unaware application via an application OpenID life cycle over a HTTPS handshake with an application programming interface (API) call.

In accordance with an embodiment, the method includes authenticating, by the processor, the wherein the application OpenID life cycle includes a public key infrastructure (PKI) authentication.

In accordance with an embodiment, the method further includes establishing, by the processor, the OpenID connection with the OpenID relying party upon authentication of the OpenID-unaware application to initiate a flow towards the OpenID provider. In accordance with an embodiment, the method includes terminating, by the processor, an incoming HTTPS connection from the OpenID-unaware application with the request from the OpenID-unaware application for access to the protected resource, and mapping, by the processor, details of the incoming HTTPS connection from the OpenID-unaware application onto a new connection with the OpenID relying party to access the protected resource for the OpenID-unaware application. In addition, the method can include mediating, by the processor, communications for the OpenID-unaware application for access to the protected resource. The method can also further include mediating, by the processor, only the access token for the OpenID-unaware application for access to the protected resource.

In accordance with an embodiment, the access token can be formatted as a JSON (JavaScript Object Notification) web token, a signed JSON web token, or an encrypted JSON web token.

In accordance with an embodiment, the method further includes maintaining, by the processor, a state of a plurality of OpenID-unaware applications via a finite state machine for profiling purposes.

In accordance with an embodiment, the OpenID-unaware application does not include an OpenID protocol for authentication of the OpenID-unaware application. In addition, the OpenID-unaware application does not include the OpenID protocol for authentication of a user of the OpenID-unaware application.

In accordance with an embodiment, the method further includes authenticating, by the processor, a user associated with the OpenID-unaware application with public key infrastructure-based (PKI-based) authentication.

In accordance with an embodiment the protected resource is a secure software application. The secure software application being a software application that require authentication of a user or end-user to access the application via the one or more resource application programming interfaces (API) 111, 112, 113. For example, the secure software application can be an application that manages print services associated with a multifunction peripheral or multifunctional printer (MFP), a financial management software application that processes and manages income, expenses, and assets for individuals or organizations, or a medical software application that manages medical records, appointments, billing and other related medical tasks within a medical office or a healthcare system.

Figure 5:
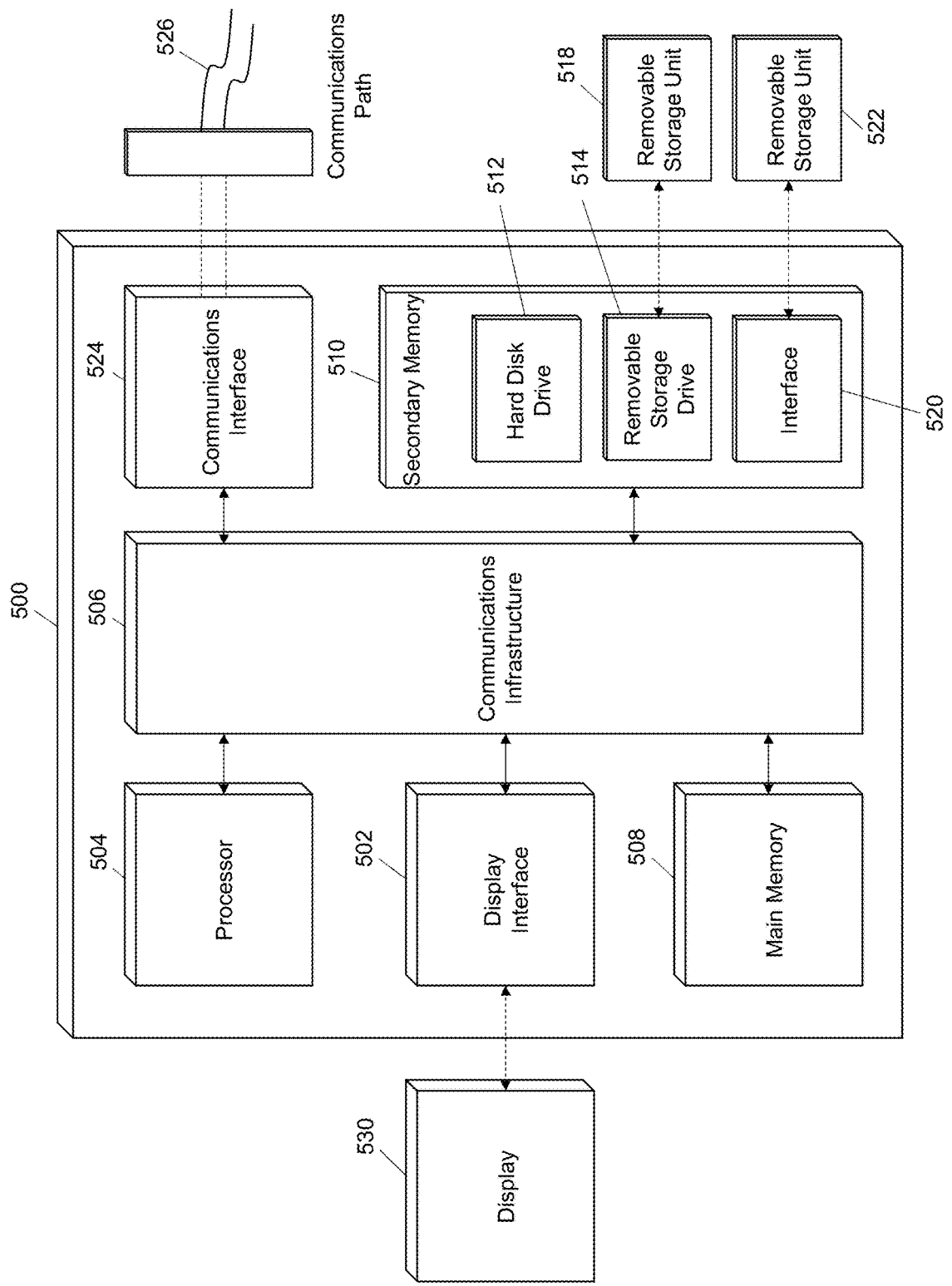
FIG. 5 is an illustration of an exemplary hardware architecture for an embodiment of a computer system.

FIG. 5 illustrates a representative computer system 500 in which embodiments of the present disclosure, or portions thereof, may be implemented as computer-readable code executed on hardware. For example, the one or more computer systems, servers, or client devices 115, 117, 121, 221, 223, 225 associated with the method and system as disclosed herein may be implemented in whole or in part by a computer system 500 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the presently described method and system.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this representative computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

A processor device (or processor) 504 may be processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc. Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 1-4, as discussed herein. Accordingly, such computer programs may represent controllers of the computer system 500. Where the present disclosure is implemented using software executed on hardware, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software executed on hardware, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

In accordance with an exemplary embodiment, the methods and processes as disclosed can be implemented on a non-transitory computer readable medium. The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present disclosure may be implemented such that its software part has been written onto a recording medium in advance and will be read as required in operation.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional examples that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for accessing protected resources, the method comprising:
   receiving, by a processor, a request from an OpenID-unaware application for access to a protected resource;
   authenticating, by the processor, the OpenID-unaware application;
   establishing, by the processor, an OpenID connection with an OpenID relying party upon authentication of the OpenID-unaware application;
   receiving, by the processor, an access token issued by an OpenID identity provider for the OpenID-unaware application for access to the protected resource; and
   facilitating, by the processor, a user associated with the OpenID-unaware application via an application OpenID life cycle over a HTTPS handshake with an application programming interface (API) call.

2. The method according to claim 1, further comprising:
   authenticating, by the processor, a user associated with the OpenID-unaware application; and
   establishing, by the processor, the OpenID connection with the OpenID relying party upon the authentication of the user associated with the OpenID-unaware application.

3. The method according to claim 1, wherein the application OpenID life cycle includes a public key infrastructure (PKI) authentication.

4. The method according to claim 1, further comprising:
   establishing, by the processor, the OpenID connection with the OpenID relying party upon authentication of the OpenID-unaware application to initiate a flow towards the OpenID provider.

5. The method according to claim 1, further comprising:
   terminating, by the processor, an incoming HTTPS connection from the OpenID-unaware application with the request from the OpenID-unaware application for access to the protected resource; and
   mapping, by the processor, details of the incoming HTTPS connection from the OpenID-unaware application onto a new connection with the OpenID relying party to access the protected resource for the OpenID-unaware application.

6. The method according to claim 5, further comprising:
   mediating, by the processor, communications for the OpenID-unaware application for access to the protected resource.

7. The method according to claim 5, further comprising:
   mediating, by the processor, only the access token for the OpenID-unaware application for access to the protected resource.

8. The method according to claim 1, wherein the access token is formatted as a JSON (JavaScript Object Notification) web token, a signed JSON web token, or an encrypted JSON web token.

9. The method according to claim 1, further comprising:
   maintaining, by the processor, a state of a plurality of OpenID-unaware applications via a finite state machine for profiling purposes.

10. The method according to claim 1, wherein the OpenID-unaware application does not include an OpenID protocol for authentication of the OpenID-unaware application.

11. The method according to claim 10, wherein the OpenID-unaware application does not include the OpenID protocol for authentication of a user of the OpenID-unaware application.

12. The method according to claim 1, further comprising:
   authenticating, by the processor, a user associated with the OpenID-unaware application with public key infrastructure-based (PKI-based) authentication.

13. The method according to claim 1, wherein the protected resource is a secure software application.

14. A computer program product for accessing protected resources, the computer program product comprising:
   a non-transitory computer-readable storage medium having program instructions embodied therewith, the program instructions executable by a computer to cause the computer to perform a process, comprising:
  receiving a request from an OpenID-unaware application for access to a protected resource;
  authenticating the OpenID-unaware application;
  establishing an OpenID connection with an OpenID relying party upon authentication of the OpenID-unaware application;
  receiving an access token issued by an OpenID identity provider for the OpenID-unaware application for access to the protected resource; and
  facilitating a user associated with the OpenID-unaware application via an application OpenID life cycle over a HTTPS handshake with an application programming interface (API) call.

15. The computer program product according to claim 14, further comprising:
  authenticating a user associated with the OpenID-unaware application; and
  establishing the OpenID connection with the OpenID relying party upon the authentication of the user associated with the OpenID-unaware application.

16. The computer program product according to claim 14, wherein the application OpenID life cycle includes a public key infrastructure (PKI) authentication.

17. A computer system comprising:
a memory; and
a processor configured to:
  receive a request from an OpenID-unaware application for access to a protected resource;
  authenticate the OpenID-unaware application;
  establish an OpenID connection with an OpenID relying party upon authentication of the OpenID-unaware application;
  receive an access token issued by an OpenID identity provider for the OpenID-unaware application for access to the protected resource; and
  facilitate a user associated with the OpenID-unaware application via an application OpenID life cycle over a HTTPS handshake with an application programming interface (API) call.

18. The computer system according to claim 17, wherein the processor is further configured to:
  authenticate a user associated with the OpenID-unaware application; and
  establish the OpenID connection with the OpenID relying party upon the authentication of the user associated with the OpenID-unaware application.

* * * * *